(12) United States Patent
Liao et al.

(10) Patent No.: US 6,436,426 B1
(45) Date of Patent: Aug. 20, 2002

(54) PROCESS FOR PRODUCING POROUS POLYMER MATERIALS

(75) Inventors: Chun-Jen Liao; Chin-Fu Chen, both of Taipei; Jui-Hsiang Chen; Ken-Yuan Chang, both of Hsinchu; Yure-Ru Lin, Yi-Lan Hsien; Shu-Fang Chiang, Hsinchu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/870,370

(22) Filed: May 30, 2001

(30) Foreign Application Priority Data

Aug. 18, 2000 (TW) .......................................... 89116762

(51) Int. Cl.$^7$ ............................... A61F 2/00; C08J 9/26
(52) U.S. Cl. ........................ 424/426; 424/422; 424/423; 424/425; 424/484; 424/486; 424/487; 521/61
(58) Field of Search ................................. 424/422, 423, 424/425, 426, 484, 486, 487; 521/61

(56) References Cited

U.S. PATENT DOCUMENTS

| 2,006,687 A | * | 7/1935 | Riddock |  |
|---|---|---|---|---|
| 2,542,527 A | * | 2/1951 | Honey et al. | |
| 2,554,485 A | * | 5/1951 | Wilson | |
| 3,536,796 A | * | 10/1970 | Rock | |
| 4,199,864 A | | 4/1980 | Ashman | 433/175 |
| 5,508,036 A | | 4/1996 | Bakker et al. | 424/424 |
| 5,512,600 A | | 4/1996 | Mikos et al. | 521/61 |
| 5,514,378 A | | 5/1996 | Mikos et al. | 424/425 |
| 5,686,091 A | | 11/1997 | Leong et al. | 424/426 |
| 5,696,175 A | | 12/1997 | Mikos et al. | 521/61 |
| 5,723,508 A | | 3/1998 | Healy et al. | 521/61 |
| 5,766,618 A | | 6/1998 | Laurencin et al. | 424/426 |
| 5,856,367 A | | 1/1999 | Barrows et al. | 521/64 |
| 5,869,080 A | | 2/1999 | McGregor et al. | 424/426 |

* cited by examiner

Primary Examiner—Morton Foelak
(74) Attorney, Agent, or Firm—Ladas & Parry

(57) ABSTRACT

The present invention provides a process for producing porous polymer materials. In the present invention, a polymer material and a soluble material are mixed in their solid states. The surface of the polymer material is partially dissolved and fused by introducing a solvent. The present invention makes use of a pressure difference while introducing a non-solvent into the polymer material to solidify and resolve the solved polymer material. Then, a substantial amount of water is used to wash the inside soluble material out. Therefore, the porous polymer materials with high porosity and interconnecting pores inside the materials are produced massively and rapidly.

13 Claims, 4 Drawing Sheets

500 μm

100 μm

PROCESS FOR PRODUCING POROUS POLYMER MATERIALS

BACKGROUND OF THE INVENTION

1. Field of the Invention

The present invention relates to a process for producing porous polymer materials and, more particularly, to a process for producing porous polymer materials which are used in biomedical engineering.

2. Description of the Prior Art

Recently, with the development of biotechnology, biomedical materials are combined with a technology of tissue or cell culture in order to develop a new research field in tissue engineering. A very important key technology in the tissue engineering is to develope a biodegradable porous material substrate. The tissue or cell attaches and grows on the three-dimensional structure of the porous material. As the tissue or cell is grown, the porous material is degraded and absorbed. Finally, the implanted cell and the composite substrate replace the tissue defection region and become part of the human body. In order to germinate the cell in porous materials, porous materials are developed with the following characteristics:

(1) capable of being absorbed and degraded;
(2) high porosity;
(3) suitable pore size;
(4) three-dimensional porous structure; and
(5) interconnecting pores.

In the character of absorption, the biodegradable polymer materials, such as polyglycolide(PGA), polylactide (PLA), poly (lactide-co-glycolide) (PLGA), polycaprolactone, polydioxanone and polyorthoester, are most valuable at the present time. These polymer materials could be degraded into small molecular chains in organism. The products would be excreted out of human body via a metabolism process. Therefore, the degraded products will not be remained in human body.

As to the development of the tissue engineering technology, there are several processes to prepare the biodegradable porous polymer materials in recent years. Conventional methods for preparing the porous polymer materials are classified as follows:

1. solution casting;
2. solvent-casting particulate leaching;
3. gel casting;
4. gas saturation;
5. phase separation;
6. bonded fiber; and
7. particle sintering.

The phase separation method is frequently mentioned. The major principle of the phase separation method includes mixing two liquids which are insoluble in each other, such as aqueous solution and polymer solution, congealing the mixture in freeze, putting it into a copper vessel and freeze-drying to suck all of the aqueous solution out of the vessel. Finally, the porous polymer material is formed after drying in vacuum at room temperature for seven days. The advantage of this method resides in forming porous materials with high porosity (about 90 vol %) and interconnecting pores. The pore size and the porosity are controlled by the amount of the aqueous solution. However, the mixture is solidified by congealing in freeze and the pore morphology is influenced by the shape of congealing ice crystal. The technology of controlling the shape of ice crystal and the uniformity of particle size are not matured until now and still need to be improved. Moreover, the porous materials formed by phase separation method need to be dried in vacuum by using the freeze dryer. The cost is expensive and the size of porous materials is not easy to be magnified. These are disadvantage to mass production.

Except the phase separation method, the bonded fiber method and the particle sintering method are commonly used for preparing porous polymer materials. The theorem of these two methods is that the polymer fiber or particles are coagulated to each other by physical heating to form a three-dimensional structure. According to the recently published processes, the polymer bonded fiber method needs more than two polymers and solvents, and the procedures are complicated and disadvantageous for mass production. In the particle sintering method, the porosity formed after the particles are coagulated by sintering is low, and the pore size is too small to be practicable. Moreover, the common defect of these two methods is that the materials are coagulated by heating treatment. The polymer materials would probably decompose during the heating treatment, and the original characteristics of the polymer materials would be destroyed.

As to the polymer manufacture, the solution casting method and the solvent-casting particulate leaching method are more traditional and had been researched for a longer time than other methods.

The solution casting method comprises dissolving a polymer in a solvent, shaping in the mold and separating the solvent out by suction or washing to form a porous structure. The pores formed with this method are apparently small, and the pore size normally below 50 micrometers. Besides, the solution casting method can only produce thin membranes and can hardly fabricate three-dimensional bulk articles. Adding soluble salts in the solution casting method and leaching the salts out is called the solvent-casting particulate leaching method, which is capable of producing porous structure with larger pore size.

In the solvent-casting particulate leaching method, the degradable polymer is dissolved in a solvent to form a polymer solution and the polymer solution is mixed with a soluble salt. Then, the mixture is poured into a non-solvent which can not dissolve the degradable polymer (such as water or methanol) in order to precipitate the polymer. Alternatively, the solvent might as well be removed by vacuum suction. A substantial amount of water is subsequently introduced into the materials to wash the soluble salt and to form massive interconnecting pores. The advantages of this method are that the method is simple in operation and, the pore size and the porosity of the materials are easily controlled by the amount and the particle size of the added salt. However, due to the density difference between the liquid polymer solution and the solid salt, the distribution of the soluble salt is not uniform in the polymer solution. Moreover, the polymer solution and the soluble salt particles are respectively mixed in a liquid state and a solid state so that the salt particles are wrapped by the polymer solution. When the polymer are precipitated from water or the solvent is sucked out, the wraped salt can not be washed out and still remains in the final porous materials. Additionally, a solidified layer is formed on the outer layer of the polymer when the polymer is precipitated or the solvent is sucked out. The solidified layer will inhibit the outside water to get into the material and the inside solvent to be sucked out from the material. Consequently, the inside salt will not be washed out and the organic solvent will remain inside the materials. Therefore, most of the porous materials, prepared by solvent-casting particulate leaching, have a limitation of thickness, i.e., only thin articles such as membrane could be made. Lamination of several layers of membrane is normally applied if a three-dimensional bulk article is desired.

To overcome the above disadvantages of the prior art, the present invention provides a novel and effective method for producing porous polymer materials.

SUMMARY OF THE INVENTION

The present invention provides a process for rapidly and massively producing porous polymer materials which have high porosity and interconnecting pores.

The present invention provides a novel process for producing a porous polymer material to overcome the disadvantages of the solvent-casting particulate leaching method. According to the solvent-casting particulate leaching method, the major disadvantage of preparing the three-dimensional substrate is unable to precipitate the polymer material and introduce water into the material deeply to wash the salts out. Therefore, the present invention uses a pressure difference while forming the porous polymer matrix and washing the salts out. The pressure difference is used to introduce water into the materials to precipitate the polymer and wash the salt particles out.

Only the pressure difference cannot introduce water into the liquid polymer solution. Therefore the polymer material of the present invention is not mixed with salt particles after being dissolved in an organic solvent, but directly mixed with salt particles in its solid state. The mixture is placed into an apparatus which can be introduced a liquid and a pressure difference. A solvent is introduced through the mixture of the polymer material and the salt particles to dissolve and fuse the surface of the polymer materials. A pressure difference is used to suck a surplus solvent. A non-solvent is then introduced through the partially dissolved polymer material to precipitate and solidify the partially dissolved polymer parts. Finally, a substantial amount of water is used to wash the inside salt particles out so as to form a porous structure.

In one embodiment of the present invention, the polymer particles and the salt particles are mixed in their solid states. Therefore, the mixed particles have a massive space between particles and could be introduced with a solvent and a non-solvent deeply. The polymer material not only has porous structure formed after the salt particles are dissolved, but also has interconnecting channels formed after the non-solvent and water pass through the space within the particles. The process of the present invention can manufacture a high porosity three-dimensional structure with interconnecting pores and rapidly produce the porous polymer materials in large size.

In comparison with conventional technologies, the process of the present invention is quicker and easier. Besides, the water can pass through the inside of the materials massively and deeply, and no salt particles and solvent residual are left. The porosity and pore size of the resulted substrate are controlled by the ratio and the particle size of the added salt particles. In the future, the substrates with different porosity and pore size can be prepared in accordance with different requirements. Moreover, the size of the porous polymer materials depends on the vessel of the apparatus, such as a leach. The larger the vessel is used, the larger the volume of the three-dimensional porous polymer material is formed. The present invention is beneficial in mass production because the disadvantages of conventional technologies are overcome.

BRIEF DESCRIPTION OF THE DRAWINGS

FIGS. 3a and 3b depict the scanning electron microscopic results of the porous polymer material obtained in an embodiment of the present invention, wherein the magnification of FIG. 3b is five-time greater than that of FIG. 3a.

DETAILED DESCRIPTION OF THE INVENTION

Figure 1:
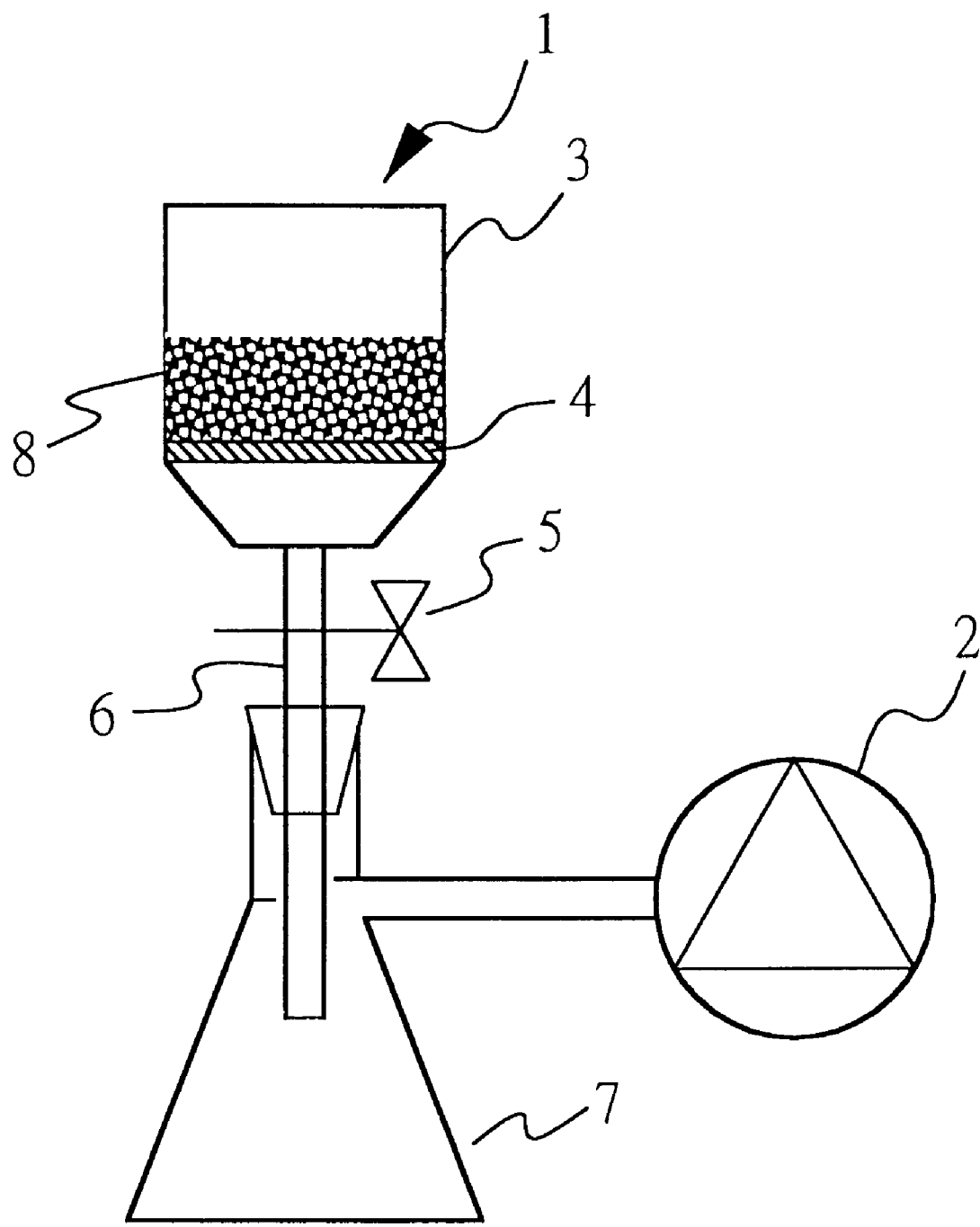
FIG. 1 depicts an apparatus in an embodiment of the present invention.

In order to avoid the disadvantages of conventional technologies and to rapidly and massively produce porous polymer materials with high porosity and interconnecting pores, the present invention discloses a process for producing porous polymer materials, comprising the following steps:

(a) mixing a polymer material and a soluble material;

(b) dissolving and fusing the surface of the polymer material;

(c) introducing a non-solvent to precipitate and solidify the polymer material; and (d) washing the soluble material out.

Preferably, the polymer material and the soluble material of the invention are mixed in their solid states. The polymer material is preferably selected from the group consisting of polyglycolide (PGA), polylactide (PLA), poly (lactide-co-glycolide) (PLGA), polyanhydrides, polycaprolactone, polydioxanone, polyorthoester, polyurethane, polyacrylate, polycarbonate, polysiloxane, polyolefin, polyamide and polyimide. The soluble material is selected from the group consisting of sodium chloride, potassium chloride, potassium bromide, calcium chloride, magnesium chloride, polyethylene glycol, polypropylene glycol, gelatin and sucrose.

The polymer material is granular or fibrous, preferably, in the size of between 50 and 1000 micrometers. The particle size of the soluble material is based on the required pore size of the porous polymer materials. The size of the soluble material is preferably between 50 and 1000 micrometers. The soluble material, for example, can be an ice which is later washed out by water or melted by a increasing temperature in step (d).

Preferably, the surface of polymer materials in step (b) is dissolved in solvent. The surface of the polymer material is dissolved and fused together to surround the soluble material. The solvent used to dissolve the surface of the polymer material in step (b) is selected from the group consisting of 1,4-dioxane, acetone, chloroform, dichloromethane, tetrahydrofuran, N, N-dimethylformamide, ethyl acetate, hexafluoroacetone, hexafluoroisopropanol and sesquihydrate.

The suitable non-solvent used in step (c) to solidify the polymer material is, for example, water; $C_1$–$C_6$ alcohols, such as methanol, ethanol and iospropanol; $C_1$–$C_6$ alkanes, such as n-hexane and cyclohexane and the mixtures thereof.

The solvent used in step (d) to wash the soluble material out is such as water. Due to the soluble material surrounded by the polymer material, a porous structure in the polymer material is formed as soon as the soluble material is washed out.

In order to improve the porosity of the porous polymer material, the steps (b) (c) and (d) of the process of the invention are carried out under a pressure difference. The effects of the pressure difference are to facilitate the surface fusion and the subsequent solidification of the polymer materials, and to wash the soluble material out, respectively.

The porous polymer material produced in the invention may comprise macro and micro pores at the same time. The macro pores are between 50 and 100 micrometers and the micro pores are between 5 and 20 micrometers.

Moreover, in a preferred embodiment, the polymer materials and the solubility materials are placed in a filtration apparatus which is connected to a suction apparatus to provide a pressure difference condition.

The subject matter disclosed in the present invention may contain various changes and each of the variation can accomplish the purpose of the porous polymer material. The invention is further explained by the following example.

EXAMPLE

The polymer material used in this example is PLGA polymer prepared by ring-opening polymerization and having the molecular weight of 200,000 determined by gel permeation chromatography.

First, a lump of PLGA polymer material was pulverized in a disintegrator. Polymer particles were passed through a sieve of 60–80 meshes to obtain polymer particles in the size of between 177 and 250 micrometers. The soluble material selected in this example is sodium chloride particles which have a particle size of about 250 micrometers. The solvent used to solve the polymer material is 1,4-dioxane.

The PLGA polymer particles were mixed with sodium chloride particles at different weight percentages. The mixture of PLGA polymer particles and sodium chloride particles were poured into the apparatus shown in FIG. 1. The apparatus in the example comprises a filtration apparatus 1 and a suction apparatus 2 which is connected to the filtration apparatus 1 and provides a pressure difference. The filtration apparatus 1, one of the conventional apparatuses, comprises a filtration vessel 3 for holding the polymer particles and the soluble particles, a Teflon filter film 4, a valve 5 for controlling a filtrate flowing in the filtration vessel 3, a filtrate conduit 6 for the filtrate flow, and a filtrate vessel 7 for receiving the filtrate. A mixture 8 of the polymer material and the soluble material was placed into the filtration vessel 3.

Figures 2A, 2B, 2C:
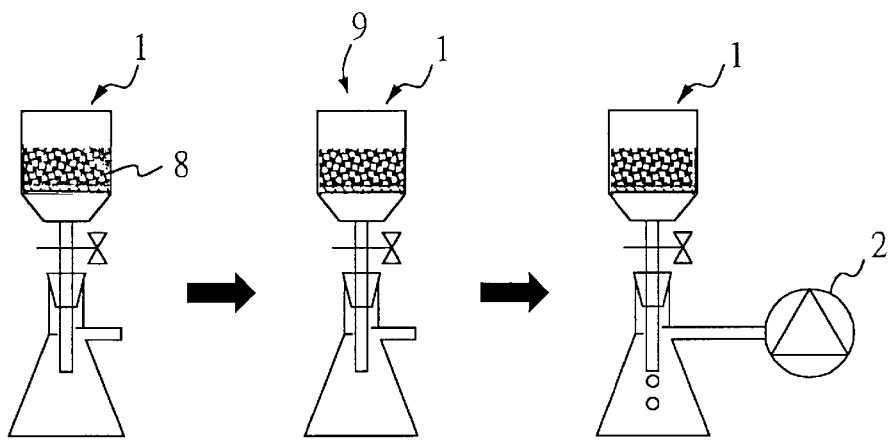
FIGS. 2a to 2f depict a process according to an embodiment of the present invention.

Please refer to FIGS. 2a to 2f which show the embodiment of the process of the invention. FIG. 2a depicts the mixture 8 of the polymer material and the soluble material which is placed in the filtration vessel 3 of the filtration apparatus 1. Then the organic solvent 9, 1,4-dioxane, was poured into the mixture for solving the surface of the polymer material, shown in FIG. 2b. The suction apparatus 2 was turned on to provide a pressure difference for sucking the surplus solvent and causing the dissolved surface of the polymer particles to fuse.

Figures 2D, 2E, 2F:
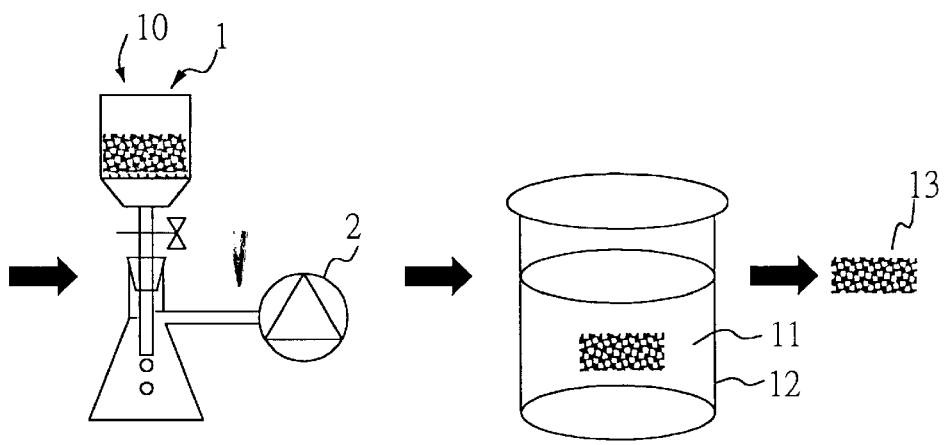

As shown in FIG. 2d, a mass of distilled ionic water 10 was poured into the filtration vessel 3 and the suction apparatus 2 was turned on again. A mass of distilled water 10 passed through the materials to solidify and precipitate the dissolved polymer material and to wash out the inside sodium chloride particles.

The solidified polymer material was taken out of the filtration vessel 3, shown in FIG. 2e, and put into a beaker 12 with distilled ionic water 11. The distilled water 11 was changed every six hours at room temperature. The polymer material was stirred in the distilled water for one day to get a porous polymer material 13, shown in FIG. 2f.

The pores of the porous polymer material 13 produced in the invention is tested according to ASTM D-3576-94. The porosity test of the porous polymer material is according to Hsu et al in J. Biomed. Mater. Res. vol:35, 107–116, 1997. The microstructure of the porous materials is observed in scanning electron microscope, operated at a current of 40 mV.

Figure 3A:
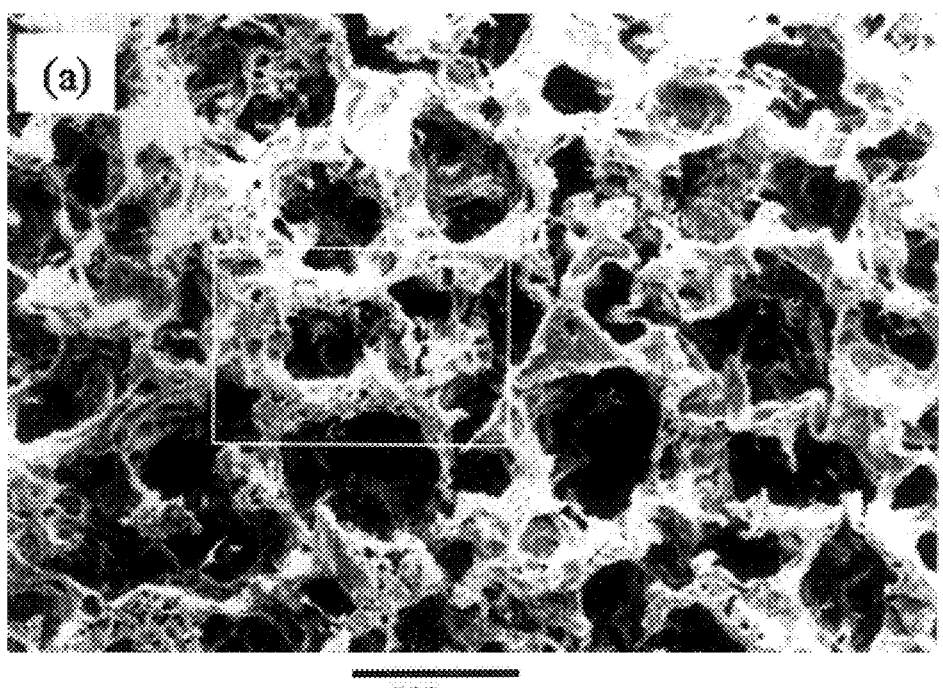
Figure 3B:
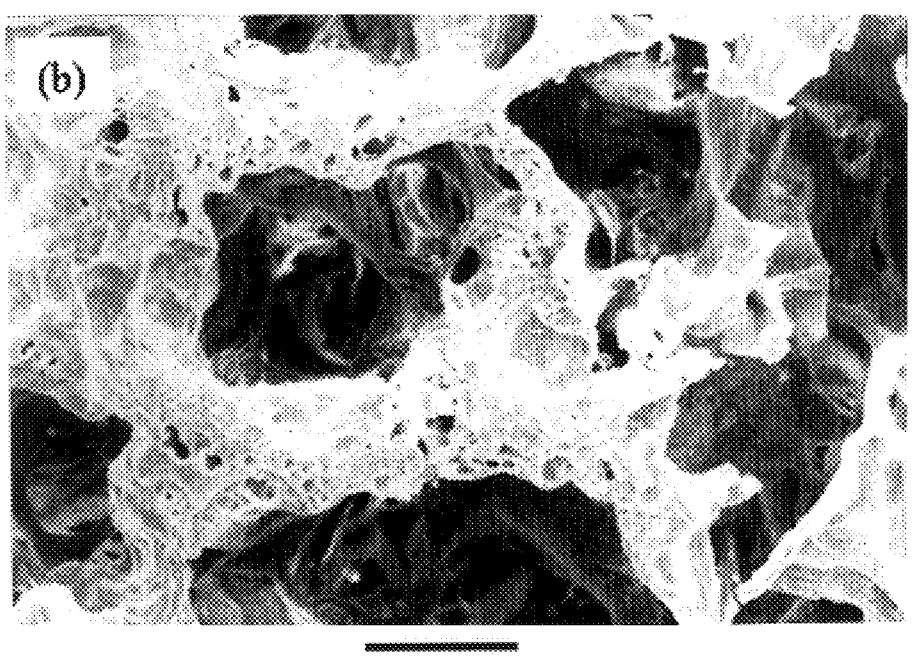

FIG. 3a shows the scanning electron microscopic results of the porous polymer material 13, wherein the mixing weight ratio of PLGA particles and sodium chloride particles is 10/90. The pore size of the porous material is between 150 and 350 micrometers. The porosity distribution within the material is quite uniform, and the pores of the porous structure are interconnecting. FIG. 3b shows the microstructure of the porous material in high magnification. It is found that the porous polymer material 13 obtained in the present invention has not only the large pores but also the micro pores, i.e. less than about 5 micrometers. The different pores structures existing in the porous material are beneficial in applications of the tissue engineering.

Figure 4:
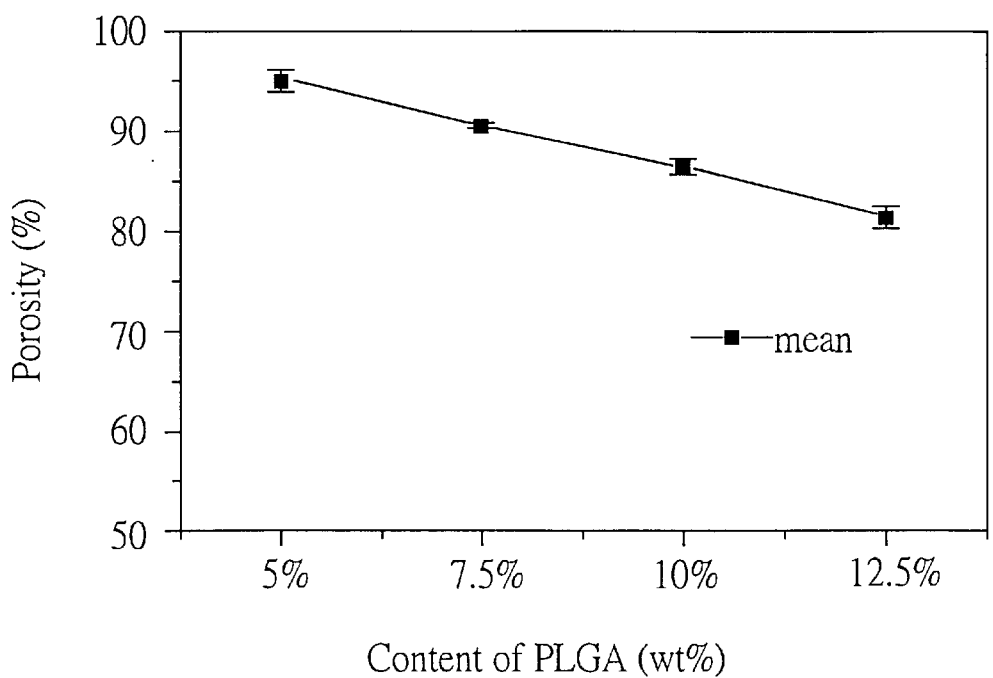
FIG. 4 depicts the porosity of the porous polymer material which is obtained by mixing different weight percentages of PLGA and sodium chloride according to the present invention.

FIG. 4 shows the porosity of the porous polymer material 13 obtained in the present invention, wherein the mixing weight ratio of the PLGA particles and sodium chloride particles is varied. The different porosity of the porous polymer materials is formed due to different mixing ratios of PLGA particles and sodium chloride particles. The porosity of all the porous polymer materials is high than 85 vol %.

The process disclosed in the present invention can massively and rapidly produce the porous polymer materials with high porosity and interconnecting pores.

The methods and features of this invention have been thoroughly described in the above example and description. It should be understood that any modifications or changes without departing from the spirits of the invention are intended to be covered in the protection scopes of the invention.

What is claimed is:

1. A process for producing porous polymer materials, comprising the following steps:
   (a) mixing a polymer material and a soluble material;
   (b) dissolving and fusing the surface of the polymer material;
   (c) introducing a non-solvent to solidify and precipitate the surface of polymer material; and
   (d) washing the soluble material out.

2. The process of claim 1, wherein the polymer material and the solubility material in step (a) are mixed in their solid states.

3. The process of claim 1, wherein the polymer material is selected from the group consisting of polyglycolide (PGA), polylactide (PLA), poly (lactide-co-glycolide) (PLGA), polyanhydrides, polycaprolactone, polydioxanone, polyorthoester, polyurethane, polyacrylate, polycarbonate, polysiloxane, polyolefin, polyamide and polyimide.

4. The process of claim 1, wherein the polymer material in step (a) is granular or fibrous.

5. The process of claim 1, wherein the particle size of the polymer material in step (a) is between 50 and 1000 micrometers.

6. The process of claim 1, wherein the soluble material is selected from the group consisting of sodium chloride, potassium chloride, potassium bromide, calcium chloride, magnesium chloride, polyethylene glycol, polypropylene glycol, gelatin and sucrose.

7. The process of claim 1, wherein the surface of the polymer material in step (b) is partially dissolved in a solvent.

8. The process of claim 7, wherein the solvent is selected from the group consisting of 1,4-dioxane, acetone, chloroform, dichloromethane, tetrahydrofuran, N,N-dimethylformamide, ethyl acetate, hexafluoroisopropanol, hexafluoroacetone and sesquihydrate.

9. The process of claim 1, wherein the non-solvent is selected from the group consisting of water, $C_1$–$C_6$ alcohols, $C_1$–$C_6$ alkane, aqueous solution containing salt and the mixtures thereof.

10. The process of claim 9, wherein the non-solvent is selected from the group consisting of water, methanol, ethanol, isopropanol, n-hexane, cyclohexane and the mixtures thereof.

11. The process of claim 1, wherein the step (b), (c) or (d) is carryed out under a pressure difference condition.

12. The process of claim 1, wherein the produced porous polymer material comprises macro pores and micro pores, and the macro pores are between 50 and 100 micrometers and the micro pores are between 5 and 20 micrometers.

13. The process of claim 11, wherein the polymer material and the solubility material are placed in a filtration apparatus which is connected to a suction apparatus to provide a pressure difference.

* * * * *